June 17, 1958   E. J. STIBURSKI   2,838,990
ROASTING RACK FOR WIENERS AND THE LIKE
Filed June 10, 1953
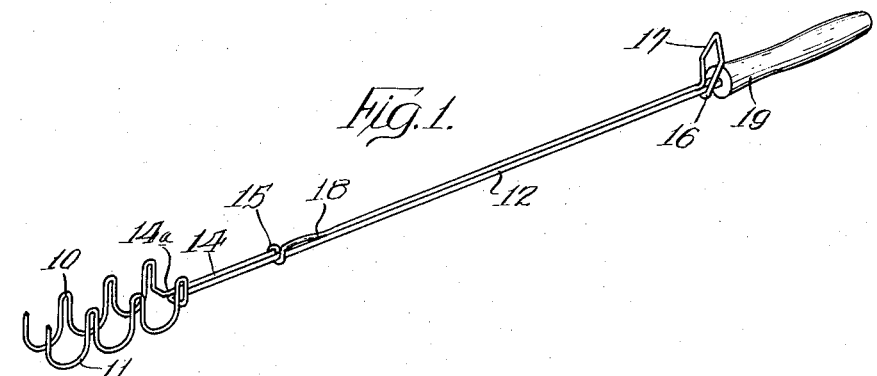
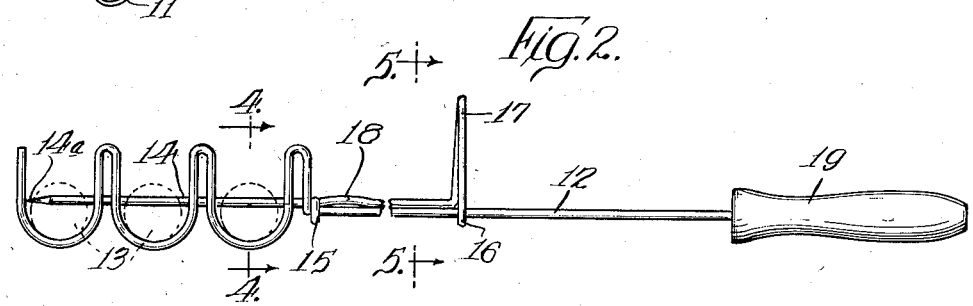
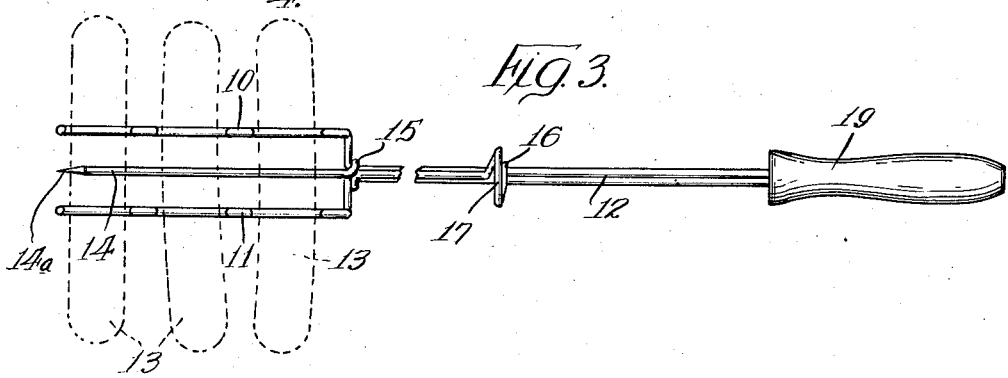
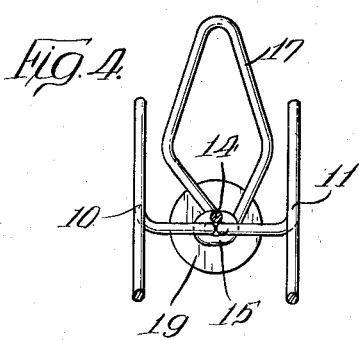
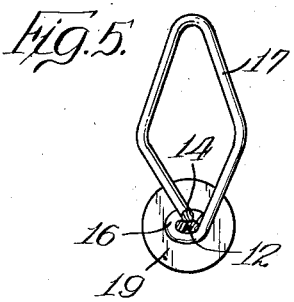
INVENTO
Edward J. Stiburski
BY
Atty:

United States Patent Office 2,838,990
Patented June 17, 1958

2,838,990

ROASTING RACK FOR WIENERS AND THE LIKE

Edward J. Stiburski, East Chicago, Ind., assignor to Ekco Products Company, Chicago, Ill., a corporation of Illinois Application June 10, 1953, Serial No. 360,684

1 Claim. (Cl. 99—419)

This invention relates to a culinary implement of the type especially adapted for use as a roasting rack for wieners and the like.

It is a primary object of this invention to provide an implement of this character embodying a rack on which a wiener or the like may be placed and held while being roasted and from which the contents may be removed without touching them with the hand.

Another object is to provide in such an implement a rack on which two or more wieners or the like may be simultaneously placed and held for roasting purposes and from which said wieners or the like may be successively removed.

It is a further object of this invention to provide an implement of this character wherein the article, such as a wiener or the like, is selectively freed from or anchored to the supporting rack according to the position of a retractable control member cooperating with said rack.

Other features and advantages will become more readily apparent from the following description and the accompanying illustrative drawings wherein:

Fig. 1 is a perspective view of the culinary tool embodying the present invention with the operating member in retracted position to clear the rack.

Fig. 2 is an enlarged fragmentary side elevational view thereof showing the operating member in advanced position for cooperation with wieners or the like contained on the rack.

Fig. 3 is an enlarged fragmentary top view of the culinary tool in accordance with the position of parts as shown in Fig. 2.

Figs. 4 and 5 are enlarged sections taken on lines 4—4 and 5—5, respectively of Fig. 2, with parts in elevation.

Referring more particularly to the drawings, the rack constituting the exemplary embodiment of the present invention comprises a pair of arcuately formed article supporting arms 10 and 11 forming a forward extension of an elongated shank 12, which cooperate to define a trough-like frame extending transaxially of the shank 12 into which an article 13, such as a wiener or the like may be inserted from the top or opposite ends. The article 13 may accordingly have on and off sliding movement via the open ends of the trough-like frame thus provided by the arms 10 and 11, as well as clearance for removal via the open area at the top of the frame. While providing for such easy loading and unloading of the article 13, the arcuate formation of the arms is so proportioned as to embrace more than half the thickness of the article supported thereon whereby the latter is located in a fixed position fore and aft of the arms 10 and 11 when said arms are in article-supporting position.

The rack as illustrated in the drawings contemplates arms 10 and 11 of such length as to provide three such trough-like frames whereby the rack is adapted to simultaneously accommodate three articles 13, such as wieners or the like arranged in a separated succession fore and aft of the shank 12. It is obvious that any desired number of trough-like frames may be provided in the same row, or a plurality of rows may be used according to the arrangement which is preferred.

A control member or rod 14 connected to the shank 12 for relative fore and aft movement, is adapted to travel into an advanced position between the arms 10 and 11 for engagement with articles 13 in supported position on said arms whereby removal of the articles therefrom is prevented by said rod 14. Accordingly the articles 13 are securely held on the arms 10 and 11 during manipulations of the implement as desired to progressively present different sides of the articles 13 for roasting over an open fire. As shown in the drawings, the rod has a sharpened end 14a which moves in a path effective to penetrate the articles 13 in supported position on the arms 10 and 11. However, it will be understood that the distance between the path of the rod and the article supporting surfaces of the arms may be so varied as to conform with the full thickness of the articles 13 whereby interengagement of the rod and the articles is established in a plane externally of the articles. Also the path of the rod might be such as to have engagement with the portions of the articles 13 located outside the area between the arms 10 and 11.

The range of fore and aft movement of the rod 14 is such as to provide for its location in a retracted position wherein the articles 13 are completely free of engagement by said rod. Accordingly, the rod 14 provides for progressive disengagement of the articles 13 as the rod is moved from a fully extended to a fully retracted position.

The connection between the shank 12 and the control member 14, whereby the latter is thus supported for relative sliding movement, is established, as shown in the drawings, by means of an eye 15 and an eye 16 formed on the control member 14 embracing the shank 12. The eye 16 preferably forms a part of an upturned rear end portion of the control member which affords a thumb-piece 17 for operating the member between extended and retracted positions. An offset 18 formed in the control member has such frictional engagement with the surface of the shank opposite thereto to effectively retain the control member 14 in selected positions along the path of the latter between its extended and retracted positions.

The rear end of the shank 12 is preferably fitted with a suitable non-heat conducting handle 19.

While but one embodiment of the invention is illustrated and described, it is understood that the invention is not limited thereto but is limited only by the scope of the appended claim.

What is claimed is:

A culinary implement including an elongated shank, a pair of spaced arms forming a forward extension of said elongated shank and substantially aligned therewith, each said arm being formed with a plurality of axially spaced integral troughs, the troughs of one arm being in transverse alignment relative to the shank with the troughs of the other arm to form supports therebetween for receiving a plurality of food articles in spaced relationship, and a control member slidably supported for fore and aft movement on the shank between a first extended position and a second retracted position, said control member having a forward extension rigid and substantially aligned therewith and movable to overlie said supports in said extended position and to be clear of said supports in said retracted position and with which said articles, while in supported position, have engagement to prevent removal of the articles from the supporting troughs when the control member is in its first position whereby said articles are sequentially releasable from the supporting troughs as the control member is moved from the first position toward its second position.

References Cited in the file of this patent

UNITED STATES PATENTS

| 481,691 | Currie et al. | Aug. 30, 1892 |
| 1,816,904 | Heimroth | Aug. 4, 1931 |
| 2,102,818 | Rhew | Dec. 21, 1937 |
| 2,486,496 | Romazon | Nov. 1, 1949 |
| 2,487,651 | Gudmundsen | Nov. 8, 1949 |
| 2,642,796 | LaBore | June 23, 1953 |

FOREIGN PATENTS

| 105,493 | Australia | Oct. 13, 1938 |